US011957182B2

(12) United States Patent
Cho et al.

(10) Patent No.: US 11,957,182 B2
(45) Date of Patent: Apr. 16, 2024

(54) AEROSOL GENERATING DEVICE AND METHOD OF OPERATING THE SAME

(71) Applicant: KT&G CORPORATION, Daejeon (KR)

(72) Inventors: Byung Sung Cho, Gwangmyeong-si (KR); Won Kyeong Lee, Guri-si (KR); Jong Sub Lee, Seongnam-si (KR); Dae Nam Han, Daejeon (KR)

(73) Assignee: KT&G CORPORATION, Daejeon (KR)

( * ) Notice: Subject to any disclaimer, the term of this patent is extended or adjusted under 35 U.S.C. 154(b) by 917 days.

(21) Appl. No.: 16/969,661

(22) PCT Filed: May 7, 2020

(86) PCT No.: PCT/KR2020/006011
§ 371 (c)(1),
(2) Date: Aug. 13, 2020

(87) PCT Pub. No.: WO2020/226432
PCT Pub. Date: Nov. 12, 2020

(65) Prior Publication Data

US 2023/0172282 A1 Jun. 8, 2023

(30) Foreign Application Priority Data

May 9, 2019 (KR) ........................ 10-2019-0054517

(51) Int. Cl.
*A24F 40/65* (2020.01)
*A24F 40/42* (2020.01)
(Continued)

(52) U.S. Cl.
CPC .............. *A24F 40/65* (2020.01); *A24F 40/42* (2020.01); *A24F 40/53* (2020.01); *A24F 40/57* (2020.01); *H05B 1/0252* (2013.01)

(58) Field of Classification Search
CPC .......... A24F 40/65; A24F 40/53; A24F 40/57; A24F 40/42; H05B 1/0252
See application file for complete search history.

(56) References Cited

U.S. PATENT DOCUMENTS 11,033,054 B2 6/2021 Lamb et al.
11,484,066 B2 11/2022 Rogers et al.
(Continued)

FOREIGN PATENT DOCUMENTS

CN 107340443 A 11/2017
CN 108025151 A 5/2018
(Continued)

OTHER PUBLICATIONS

International Search Report dated Nov. 4, 2018 in International Application No. PCT/KR2020/006011.
(Continued)

*Primary Examiner* — Tho D Ta
(74) *Attorney, Agent, or Firm* — Sughrue Mion, PLLC

(57) ABSTRACT

An aerosol generating device includes a main body and a cartridge detachably coupled to the main body. The main body includes a controller, a battery, and a first wireless communication unit. The cartridge includes a second wireless communication unit. The controller controls output power of the battery to apply a power pattern to the cartridge, and the first wireless communication unit establishes a wireless connection with the second wireless communication unit when power supplied from the battery to the cartridge matches a preset power pattern.

14 Claims, 8 Drawing Sheets

(51) Int. Cl.

| | |
|---|---|
| ***A24F 40/53*** | (2020.01) |
| ***A24F 40/57*** | (2020.01) |
| ***H05B 1/02*** | (2006.01) |

(56) References Cited

U.S. PATENT DOCUMENTS

| | | | |
|---|---|---|---|
| 2014/0338685 | A1 | 11/2014 | Amir |
| 2014/0345633 | A1 | 11/2014 | Talon et al. |
| 2016/0211693 | A1* | 7/2016 | Stevens ................. H04W 48/16 |
| 2016/0345628 | A1 | 12/2016 | Sabet |
| 2017/0014582 | A1 | 1/2017 | Skoda |
| 2018/0132530 | A1 | 5/2018 | Rogers et al. |
| 2018/0263283 | A1 | 9/2018 | Popplewell et al. |
| 2018/0263288 | A1 | 9/2018 | Goldstein et al. |
| 2018/0338530 | A1 | 11/2018 | Wallace |
| 2018/0352864 | A1 | 12/2018 | Takeuchi et al. |
| 2019/0380390 | A1* | 12/2019 | Jeong ....................... A24F 40/46 |
| 2020/0229499 | A1 | 7/2020 | Niebuhr et al. |
| 2021/0195957 | A1 | 7/2021 | Kessler et al. |

FOREIGN PATENT DOCUMENTS

| | | | |
|---|---|---|---|
| CN | 109936986 | A | 6/2019 |
| KR | 10-2017-0030587 | A | 3/2017 |
| KR | 10-1792905 | B1 | 11/2017 |
| KR | 10-2018-0044916 | A | 5/2018 |
| KR | 10-2018-0085339 | A | 7/2018 |
| KR | 10-2018-0085370 | A | 7/2018 |
| KR | 10-2018-0111883 | A | 10/2018 |
| KR | 10-2019-0011264 | A | 2/2019 |
| KR | 10-2019-0038181 | A | 4/2019 |
| WO | 2016/007352 | A1 | 1/2016 |
| WO | 2017/019428 | A1 | 2/2017 |
| WO | 2017/205692 | A1 | 11/2017 |
| WO | 2018/202403 | A1 | 11/2018 |
| WO | 2018/202727 | A1 | 11/2018 |
| WO | 2019/057694 | A1 | 3/2019 |
| WO | 2019/072960 | A1 | 4/2019 |

OTHER PUBLICATIONS

Office Action dated Oct. 23, 2020 in Korean Application No. 10-2019-0054517.

Extended European Search Report dated Sep. 17, 2021 in European Application No. 20743949.8.

Office Action dated Sep. 21, 2021 in Japanese Application No. 2020-538943.

Office Action dated Apr. 7, 2023 issued in Chinese Application No. 202080001373.4.

* cited by examiner

AEROSOL GENERATING DEVICE AND METHOD OF OPERATING THE SAME

CROSS-REFERENCE TO RELATED APPLICATIONS

This application is a National Stage of International Application No. PCT/KR2020/006011 filed on May 7, 2020, which claims priority under U.S.C. § 119(a) to Korean Patent Application No. 10-2019-0054517 filed on May 9, 2019.

TECHNICAL FIELD

The present disclosure relates to an aerosol generating device and a method of operating the same.

BACKGROUND ART

Recently, the demand for an alternative to traditional cigarettes has increased. For example, there is growing demand for an aerosol generating device that generates aerosol by heating an aerosol generating material, rather than by combusting cigarettes.

When the aerosol generating device includes a main body and a cartridge, data may be exchanged between the main body and the cartridge. Accordingly, a technique for forming a communication network between the main body and the cartridge is desired.

DESCRIPTION OF EMBODIMENTS

Solution to Problem

According to an aspect of the present disclosure, an aerosol generating device includes a main body including a controller, a battery, and a first wireless communication unit; and a cartridge including a second wireless communication unit, wherein the controller controls output power of the battery to apply a power pattern to the cartridge, and the first wireless communication unit establishes a wireless connection (i.e., wireless communication network or wireless communication link) with the second wireless communication unit when power supplied from the battery to the cartridge matches a preset power pattern.

According to another aspect of the present disclosure, a method of controlling an aerosol generating device including a main body and a cartridge includes controlling power supplied from a battery of the main body to the cartridge and forming a wireless communication network between the first wireless communication unit and the second wireless communication unit when the supplied power matches a preset power pattern.

According to a further aspect of the present disclosure, a computer-readable recording medium has recorded thereon a program for executing the method on a computer.

Advantageous Effects of Disclosure

According to the present disclosure, a wireless communication network is not formed between a main body and a cartridge unless the main body supplies power to the cartridge according to a preset power pattern, thereby preventing an unintended wireless communication network from being formed between the main body and the cartridge.

BEST MODE

Figure 1:
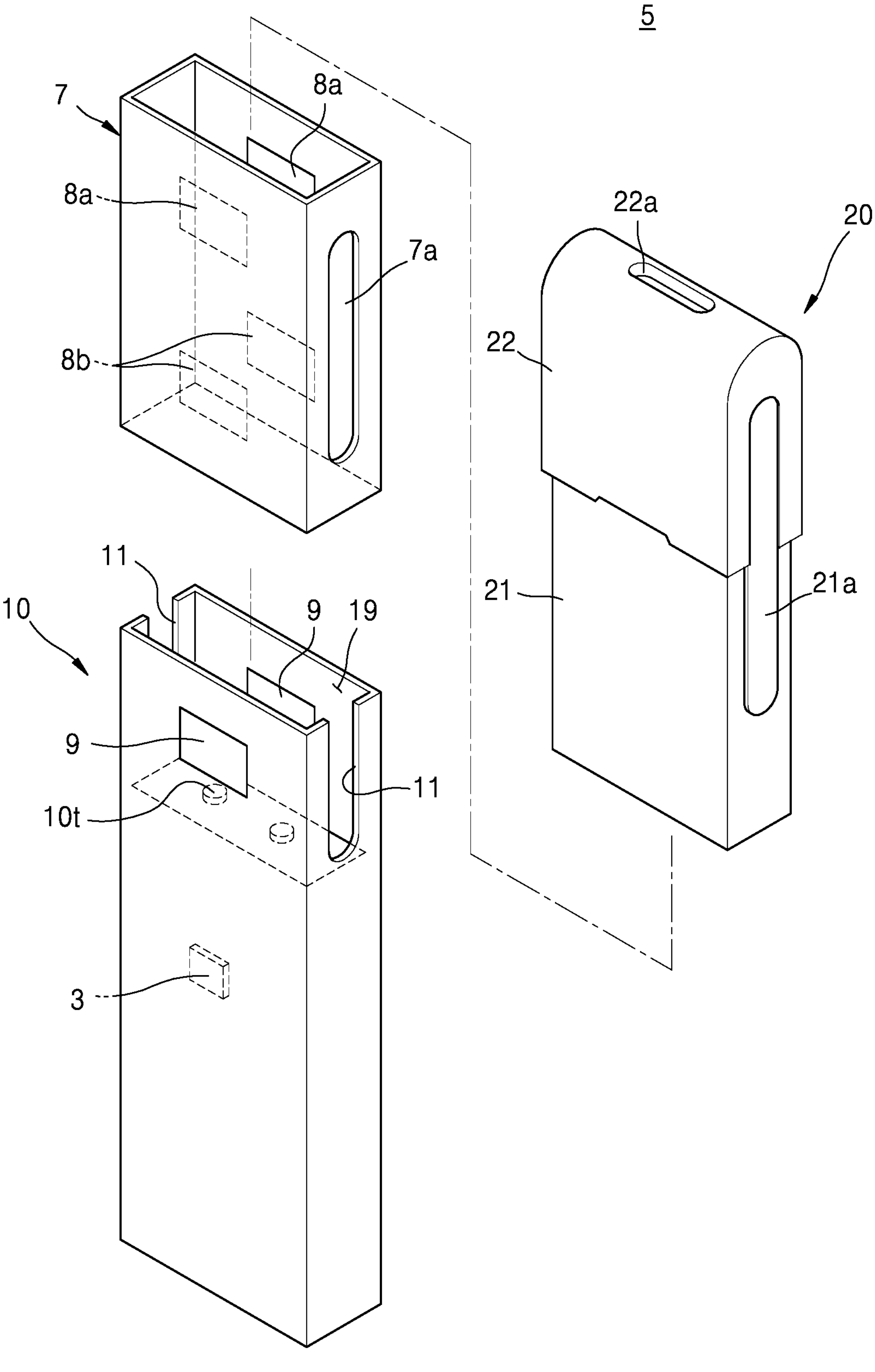
FIG. 1 is an exploded perspective view schematically illustrating a coupling relationship between a replaceable cartridge containing an aerosol generating material and an aerosol generating device including the same, according to an embodiment.

An aerosol generating device includes a main body and a cartridge detachably coupled to the main body. The main body includes a controller, a battery, and a first wireless communication unit. The cartridge includes a second wireless communication unit.

The controller controls output power of the battery to apply a power pattern to the cartridge, and the first wireless communication unit is connected to the second wireless communication unit when a preset power pattern is applied to the cartridge.

MODE OF DISCLOSURE

With respect to the terms used to describe the various embodiments, general terms which are currently and widely used are selected in consideration of functions of structural elements in the various embodiments of the present disclosure. However, meanings of the terms can be changed according to intention, a judicial precedence, the appearance of new technology, and the like. In addition, in certain cases, a term which is not commonly used can be selected. In such a case, the meaning of the term will be described in detail at the corresponding portion in the description of the present disclosure. Therefore, the terms used in the various embodiments of the present disclosure should be defined based on the meanings of the terms and the descriptions provided herein.

In addition, unless explicitly described to the contrary, the word “comprise” and variations such as “comprises” or “comprising” will be understood to imply the inclusion of stated elements but not the exclusion of any other elements. In addition, the terms “-er”, “-or”, and “module” described in the specification mean units for processing at least one function and/or operation and can be implemented by hardware components or software components and combinations thereof.

As used herein, expressions such as “at least one of,” when preceding a list of elements, modify the entire list of elements and do not modify the individual elements of the list. For example, the expression, “at least one of a, b, and c,” should be understood as including only a, only b, only c, both a and b, both a and c, both b and c, or all of a, b, and c.

It will be understood that when an element or layer is referred to as being “over,” “above,” “on,” “connected to” or “coupled to” another element or layer, it can be directly over, above, on, connected or coupled to the other element or layer or intervening elements or layers may be present. In contrast, when an element is referred to as being “directly over,” “directly above,” “directly on,” “directly connected to” or “directly coupled to” another element or layer, there are no intervening elements or layers present. Like numerals refer to like elements throughout.

Hereinafter, the present disclosure will now be described more fully with reference to the accompanying drawings, in which example embodiments of the present disclosure are shown such that one of ordinary skill in the art may easily work the present disclosure. The disclosure may, however, be embodied in many different forms and should not be construed as being limited to the embodiments set forth herein.

Hereinafter, embodiments of the present disclosure will be described in detail with reference to the drawings.

FIG. 1 is an exploded perspective view schematically illustrating a coupling relationship between a replaceable cartridge containing an aerosol generating material and an aerosol generating device including the same, according to an embodiment.

An aerosol generating device 5 according to the embodiment illustrated in FIG. 1 includes the cartridge 20 containing the aerosol generating material and a main body 10 supporting the cartridge 20.

The cartridge 20 containing the aerosol generating material may be coupled to the main body 10. A portion of the cartridge 20 may be inserted into an accommodation space 19 of the main body 10 so that the cartridge 20 may be mounted on the main body 10.

The cartridge 20 may contain an aerosol generating material in at least one of, for example, a liquid state, a solid state, a gaseous state, or a gel state. The aerosol generating material may include a liquid composition. For example, the liquid composition may be a liquid including a tobacco-containing material having a volatile tobacco flavor component, or a liquid including a non-tobacco material.

For example, the liquid composition may include one component of water, solvents, ethanol, plant extracts, spices, flavorings, and vitamin mixtures, or a mixture of these components. The spices may include menthol, peppermint, spearmint oil, and various fruit-flavored ingredients, but are not limited thereto. The flavorings may include ingredients capable of providing various flavors or tastes to a user. Vitamin mixtures may be a mixture of at least one of vitamin A, vitamin B, vitamin C, and vitamin E, but are not limited thereto. In addition, the liquid composition may include an aerosol forming agent such as glycerin and propylene glycol.

For example, the liquid composition may include any weight ratio of glycerin and propylene glycol solution to which nicotine salts are added. The liquid composition may include two or more types of nicotine salts. Nicotine salts may be formed by adding suitable acids, including organic or inorganic acids, to nicotine. Nicotine may be a naturally generated nicotine or synthetic nicotine and may have any suitable weight concentration relative to the total solution weight of the liquid composition.

Acid for the formation of the nicotine salts may be appropriately selected in consideration of the rate of nicotine absorption in the blood, the operating temperature of the aerosol generating device 5, the flavor or savor, the solubility, or the like. For example, the acid for the formation of nicotine salts may be a single acid selected from the group consisting of benzoic acid, lactic acid, salicylic acid, lauric acid, sorbic acid, levulinic acid, pyruvic acid, formic acid, acetic acid, propionic acid, butyric acid, valeric acid, caproic acid, caprylic acid, capric acid, citric acid, myristic acid, palmitic acid, stearic acid, oleic acid, linoleic acid, linolenic acid, phenylacetic acid, tartaric acid, succinic acid, fumaric acid, gluconic acid, saccharic acid, malonic acid, and malic acid, or may be a mixture of two or more acids selected from the above-described group, but is not limited thereto.

The cartridge 20 may be operated by an electrical signal or a wireless signal transmitted from the main body 10 to perform a function of generating aerosol by converting the phase of the aerosol generating material inside the cartridge 20 to a gaseous phase. The aerosol may refer to a gas in which vaporized particles generated from an aerosol generating material are mixed with air.

For example, in response to receiving the electrical signal from the main body 10, the cartridge 20 may convert the phase of the aerosol generating material by heating the aerosol generating material, using, for example, an ultrasonic vibration method or an induction heating method. In an embodiment, the cartridge 20 may include its own power source and generate aerosol based on an electric control signal or a wireless signal received from the main body 10.

The cartridge 20 may include a liquid storage 21 accommodating the aerosol generating material therein, and an atomizer performing a function of converting the aerosol generating material of the liquid storage 21 to aerosol.

When the liquid storage 21 “accommodates the aerosol generating material” therein, it means that the liquid storage 21 functions as a container simply holding an aerosol generating material and that the liquid storage 21 includes therein an element containing an aerosol generating material, such as a sponge, cotton, fabric, or porous ceramic structure.

The atomizer 110 may include, for example, a liquid delivery element (e.g., a wick) for absorbing the aerosol generating material and maintaining the same in an optimal state for conversion to aerosol, and a heater heating the liquid delivery element to generate aerosol.

The liquid delivery element may include at least one of, for example, a cotton fiber, a ceramic fiber, a glass fiber, and porous ceramic.

The heater may include a metallic material such as copper, nickel, tungsten, or the like to heat the aerosol generating material delivered to the liquid delivery element by generating heat using electrical resistance. The heater may be implemented by, for example, a metal wire, a metal plate, a ceramic heating element, or the like. Also, the heater may be implemented by a conductive filament using a material such as a nichrome wire, and may be wound around or arranged adjacent to the liquid delivery element.

In addition, the atomizer may be implemented by a heating element in the form of a mesh or plate, which absorbs the aerosol generating material and maintains the same in an optimal state for conversion to aerosol, and generates aerosol by heating the aerosol generating material. In this case, a separate liquid delivery element may not be required.

At least a portion of the liquid storage 21 of the cartridge 20 may include a transparent portion so that the aerosol generating material accommodated in the cartridge 20 may be visually identified from the outside. The liquid storage 21 includes a protruding window 21*a* protruding from the liquid storage 21, so that the liquid storage 21 may be inserted into a groove 11 of the main body 10 when coupled to the main body 10. A mouthpiece 22 and/or the liquid storage 21 may be entirely formed of transparent plastic or glass. Alternatively, only the protruding window 21*a* may be formed of a transparent material.

The main body 10 includes a connection terminal 10*t* arranged inside the accommodation space 19. When the liquid storage 21 of the cartridge 20 is inserted into the accommodation space 19 of the main body 10, the main body 10 may provide power to the cartridge 20 or supply a signal related to an operation of the cartridge 20 to the cartridge 20, through the connection terminal 10*t*.

The mouthpiece 22 is coupled to one end of the liquid storage 21 of the cartridge 20. The mouthpiece 22 is a portion of the aerosol generating device 5, which is to be inserted into a user's mouth. The mouthpiece 22 includes a discharge hole 22*a* for discharging aerosol generated from the aerosol generating material inside the liquid storage 21 to the outside.

The slider 7 is coupled to the main body 10 in such a way that the slider 7 may move on the main body 10. The slider 7 covers or exposes at least a portion of the mouthpiece 22 of the cartridge 20 coupled to the main body 10 by moving with respect to the main body 10. The slider 7 includes an elongated hole 7*a* exposing at least a portion of the protruding window 21*a* of the cartridge 20 to the outside.

As shown FIG. 1, the slider 7 may have a shape of a hollow container with both ends opened, but the structure of the slider 7 is not limited thereto. For example, the slider 7 may have a bent plate structure having a clip-shaped cross-section, which is movable with respect to the main body 10 while being coupled to an edge of the main body 10. In another example, the slider 7 may have a curved semi-cylindrical shape with a curved arc-shaped cross section.

The slider 7 may include a magnetic body for maintaining the position of the slider 7 with respect to the main body 10 and the cartridge 20. The magnetic body may include a permanent magnet or a material such as iron, nickel, cobalt, or an alloy thereof.

The magnetic body may include two first magnetic bodies 8*a* facing each other, and two second magnetic bodies 8*b* facing each other. The first magnetic bodies 8*a* may be spaced apart from the second magnetic bodies 8*b* in a longitudinal direction of the main body 10 (i.e., the direction in which the main body 10 extends), which is a moving direction of the slider 7.

The main body 10 includes a fixed magnetic body 9 arranged on a path along which the first magnetic bodies 8*a* and the second magnetic bodies 8*b* of the slider 7 move as the slider 7 moves with respect to the main body 10. Two fixed magnetic bodies 9 of the main body 10 may be mounted to face each other with the accommodation space 19 therebetween.

The slider 7, the slider 7 may be stably maintained in a position where an end of the mouthpiece 22 is covered or exposed by a magnetic force acting between the fixed magnetic body 9 and the first magnetic body 8*a* or between the fixed magnetic body 9 and the second magnetic body 8*b*.

The main body 10 includes a position change detecting sensor 3 arranged on the path along which the first magnetic body 8*a* and the second magnetic body 8*b* of the slider 7 move as the slider 7 moves with respect to the main body 10. The position change detecting sensor 3 may include, for example, a Hall integrated circuit (IC) that uses the Hall effect to detect a change in a magnetic field, and may generate a signal based on the detected change.

In the aerosol generating device 5 according to the above-described embodiments, horizontal cross sections of the main body 10, the cartridge 20, and the slider 7 have approximately rectangular shapes (i.e., when viewed in the longitudinal direction), but in the embodiments, the shape of the aerosol generating device 5 is not limited. The aerosol generating device 5 may have, for example, a cross-sectional shape of a circle, an ellipse, a square, or various polygonal shapes. In addition, the aerosol generating device 5 is not necessarily limited to a structure that extends linearly, and may be curved in a streamlined shape or bent at a preset angle in a specific area to be easily held by the user.

Figure 2:
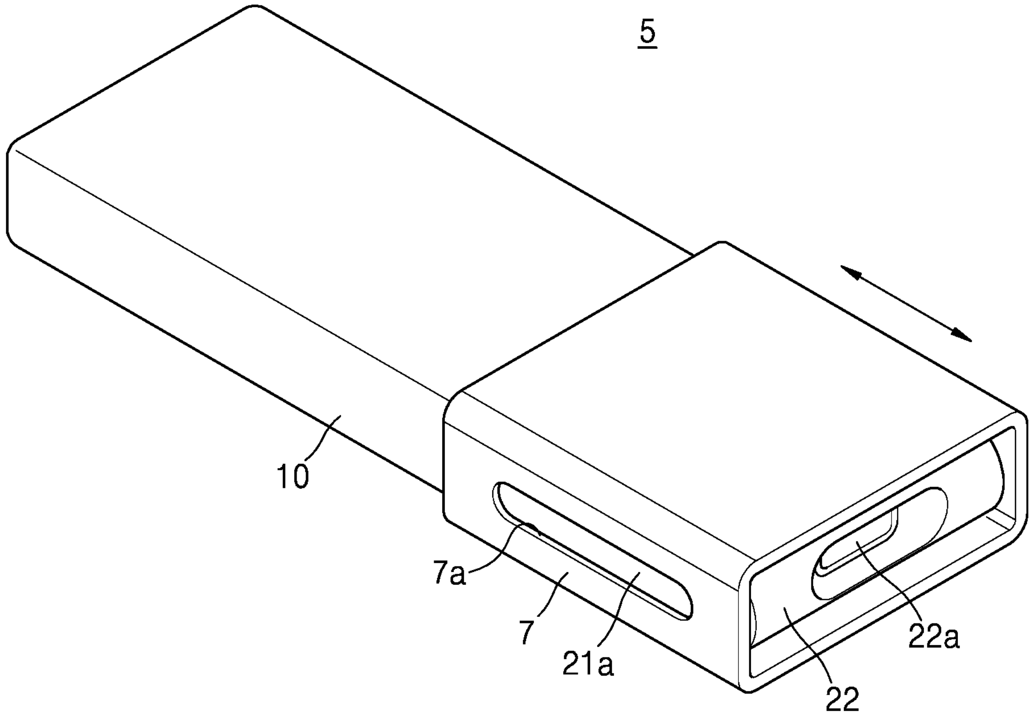
FIG. 2 is a perspective view of an example operating state of the aerosol generating device according to the embodiment illustrated in FIG. 1.

FIG. 2 is a perspective view of an example operating state of the aerosol generating device according to the embodiment illustrated in FIG. 1.

In FIG. 2, the slider 7 is moved to a position where the end of the mouthpiece 22 of the cartridge coupled to the main body 10 is covered. In this state, the mouthpiece 22 may be safely protected from external impurities and kept clean.

The user may check the remaining amount of aerosol generating material contained in the cartridge by visually checking the protruding window 21*a* of the cartridge through the elongated hole 7*a* of the slider 7. The user may move the slider 7 in the longitudinal direction of the main body 10 to use the aerosol generating device 5.

Figure 3:
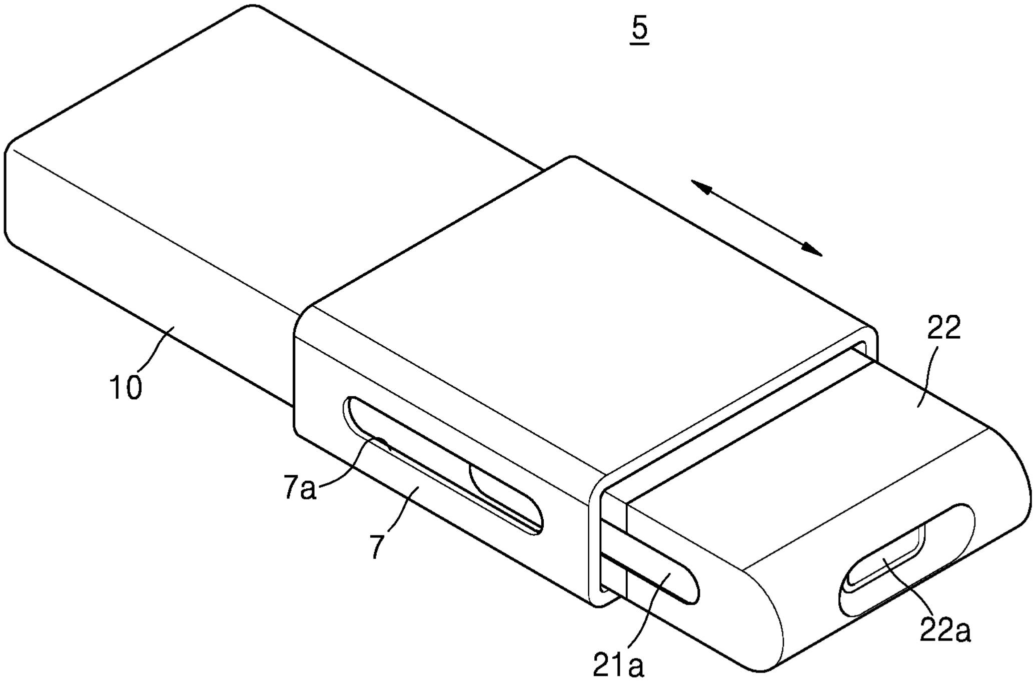
FIG. 3 is a perspective view of another example operating state of the aerosol generating device according to the embodiment illustrated in FIG. 1.

FIG. 3 is a perspective view of another example operating state of the aerosol generating device according to the embodiment illustrated in FIG. 1.

In FIG. 3, the operating state is shown in which the slider 7 is moved to a position where the end of the mouthpiece 22 of the cartridge coupled to the main body 10 is exposed to the outside. In this state, the user may insert the mouthpiece 22 into his or her mouth and inhale aerosol discharged through the discharge hole 22*a* of the mouthpiece 22.

As shown in FIG. 3, the protruding window 21*a* of the cartridge is still exposed to the outside through the elongated hole 7*a* of the slider 7 when the slider 7 is moved to the position where the end of the mouthpiece 22 is exposed to the outside. Thus, the user may visually check the remaining amount of aerosol generating material contained in the cartridge, regardless of the position of the slider 7.

Referring to FIG. 1, the aerosol generating device 5 may include the position change detecting sensor 3. The position change detecting sensor 3 may detect a change in a position of the slider 7.

In an embodiment, the position change detecting sensor 3 may detect a change in the direction, intensity, or the like of the magnetization or magnetic field of a magnetic material. A magnet may be included in the slider 7, and the position change detecting sensor 3 may detect the movement of the magnet included in the slider 7.

For example, the position change detecting sensor 3 may include a Hall effect sensor, a rotating coil, a magnetoresistor, or a superconducting quantum interference device (SQUID) but is not limited thereto.

Figure 4:
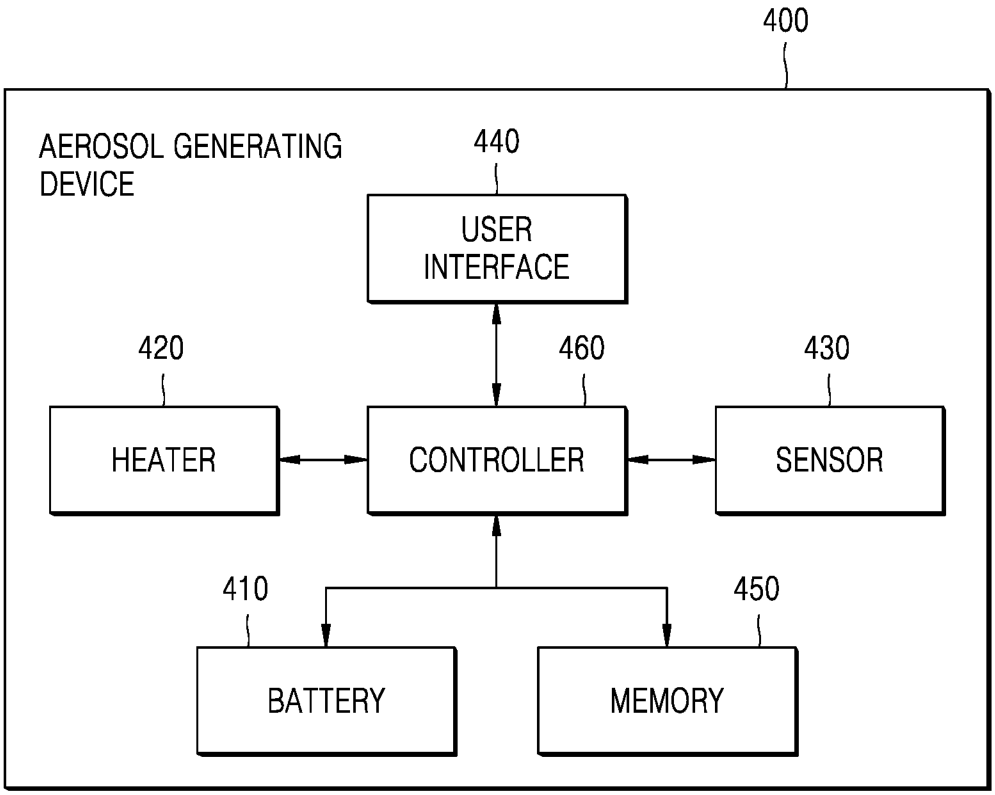
FIG. 4 is a block diagram illustrating hardware components of the aerosol generating device according to an embodiment.

FIG. 4 is a block diagram illustrating hardware components of the aerosol generating device according to an embodiment.

Referring to FIG. 4, the aerosol generating device 400 may include a battery 410, a heater 420, a sensor 430, a user interface 440, a memory 450, and a controller 460. However, the internal structure of the aerosol generating device 400 is not limited to the structures illustrated in FIG. 4. Also, it will be understood by one of ordinary skill in the art that some of the hardware components shown in FIG. 4 may be omitted or new components may be added according to the design of the aerosol generating device 400.

In an embodiment where the aerosol generating device 400 includes a main body without a cartridge, the components shown in FIG. 4 may be located in the main body. In another embodiment where the aerosol generating device 400 includes a main body and a cartridge, the components shown in FIG. 4 may be located in the main body and/or the cartridge.

Hereinafter, an operation of each of the components will be described without being limited to the location of each component of the aerosol generating device 400.

The battery 410 supplies electric power to be used for the aerosol generating device 400 to operate. For example, the battery 410 may supply power such that the heater 420 may be heated. In addition, the battery 410 may supply power required for operation of other components of the aerosol generating device 400, such as the sensor 430, the user interface 440, the memory 450, and the controller 460. The battery 410 may be a rechargeable battery or a disposable battery. For example, the battery 410 may be a lithium polymer (LiPoly) battery, but is not limited thereto.

The heater 420 receives power from the battery 410 under the control of the controller 460. The heater 420 may receive power from the battery 410 and heat a cigarette inserted into the aerosol generating device 400, or heat the cartridge mounted on the aerosol generating device 400.

The heater 420 may be located in the main body of the aerosol generating device 400. Alternatively, the heater 420 may be located in the cartridge. When the heater 420 is located in the cartridge, the heater 420 may receive power from the battery 410 located in the main body and/or the cartridge.

The heater 420 may be formed of any suitable electrically resistive material. For example, the suitable electrically resistive material may be a metal or a metal alloy including titanium, zirconium, tantalum, platinum, nickel, cobalt, chromium, hafnium, niobium, molybdenum, tungsten, tin, gallium, manganese, iron, copper, stainless steel, or nichrome, but is not limited thereto. In addition, the heater 420 may be implemented by a metal wire, a metal plate on which an electrically conductive track is arranged, or a ceramic heating element, but is not limited thereto.

In an embodiment, the heater 420 may be included in the cartridge. The cartridge may include the heater 420, the liquid delivery element, and the liquid storage. The aerosol generating material accommodated in the liquid storage may be absorbed by the liquid delivery element, and the heater 420 may heat the aerosol generating material absorbed by the liquid delivery element, thereby generating aerosol. For example, the heater 420 may include a material such as nickel or chromium and may be wound around or arranged adjacent to the liquid delivery element.

In another embodiment, the heater 420 may heat the cigarette inserted into the accommodation space of the aerosol generating device 400. When the cigarette is accommodated in the accommodation space of the aerosol generating device 400, the heater 420 may be located inside and/or outside the cigarette and generate aerosol by heating the aerosol generating material in the cigarette.

Meanwhile, the heater 420 may include an induction heater. The heater 430 may include an electrically conductive coil for heating a cigarette or the cartridge by an induction heating method, and the cigarette or the cartridge may include a susceptor which may be heated by the induction heater.

The aerosol generating device 400 may include at least one sensor 430. A result sensed by the at least one sensor 430 is transmitted to the controller 460, and the controller 460 may control the aerosol generating device 400 by controlling the operation of the heater, restricting smoking, determining whether a cigarette (or a cartridge) is inserted, displaying a notification, etc.

For example, the sensor 430 may include a puff detecting sensor. The puff detecting sensor may detect a user's puff based on a temperature change, a flow change, a voltage change, and/or a pressure change.

The sensor 430 may include a temperature sensor. The temperature sensor may detect a temperature of the heater 420 (or an aerosol generating material). The aerosol generating device 400 may include a separate temperature sensor for sensing a temperature of the heater 420, or the heater 420 itself may serve as a temperature sensor without a separate temperature sensor. Alternatively, an additional temperature sensor may be further included in the aerosol generating device 400 even the heater 420 may serve as a temperature sensor.

The sensor 430 may include a position change detecting sensor. The position change detecting sensor may detect a change in a position of the slider which is coupled to the main body and slides along the main body.

The user interface 440 may provide the user with information about the state of the aerosol generating device 400. For example, the user interface 440 may include a display or a light emitter for outputting visual information, a motor for outputting haptic information, a speaker for outputting sound information, input/output (I/O) interfacing devices (for example, a button or a touch screen) for receiving information input from the user or outputting information to the user, terminals for performing data communication or receiving charging power, and/or communication interfacing modules for performing wireless communication (for example, Wi-Fi, Wi-Fi direct, Bluetooth, near-field communication (NFC), etc.) with external devices.

The memory 450 may store various data processed or to be processed by the controller 460. The memory 450 may include various types of memories, such as dynamic random access memory (DRAM), static random access memory (SRAM), read-only memory (ROM), electrically erasable programmable read-only memory (EEPROM), etc.

For example, the memory 450 may store an operation time of the aerosol generating device 400, the maximum number of puffs, the current number of puffs, at least one temperature profile, data on a user's smoking pattern, etc.

The controller 460 may control overall operations of the aerosol generating device 400. The controller 460 may include at least one processor. A processor can be implemented as an array of a plurality of logic gates or can be implemented as a combination of a microprocessor and a memory in which a program executable in the microprocessor is stored. It will be understood by one of ordinary skill in the art that the processor can be implemented in other forms of hardware.

The controller 460 analyzes a result of the sensing by at least one sensor 430, and controls processes that are to be performed subsequently.

The controller 460 may control power supplied to the heater 420 so that the operation of the heater 420 is started or terminated, based on the result of the sensing by the sensor 430. In addition, based on the result of the sensing by the sensor 430, the controller 460 may control the amount of power supplied to the heater 420 and the time at which the power is supplied, so that the heater 420 is heated to a predetermined temperature and/or maintained at an appropriate temperature.

In an embodiment, the aerosol generating device 400 may have a plurality of modes. For example, the modes of the aerosol generating device 400 may include a preheating mode, an operating mode, an idle mode, and a sleep mode. However, the modes of the aerosol generating device 400 are not limited thereto.

The controller 460 may control the user interface 440 based on the result of the sensing by the at least one sensor 430. For example, when the number of user's puffs counted by the puff detecting sensor reaches a preset number, the controller 460 may notify the user by using the user interface 440 (e.g., a light emitter, a motor or a speaker, etc.) that the operation of the aerosol generating device 400 will soon be terminated.

Although not illustrated in FIG. 4, the aerosol generating device 400 may be coupled to a separate cradle to form an aerosol generating system. For example, the cradle may be used to charge the battery 410 of the aerosol generating device 400. For example, the aerosol generating device 400 may be supplied with power from a battery of the cradle to charge the battery 410 of the aerosol generating device 400 while being accommodated in an accommodation space of the cradle.

Figure 5:
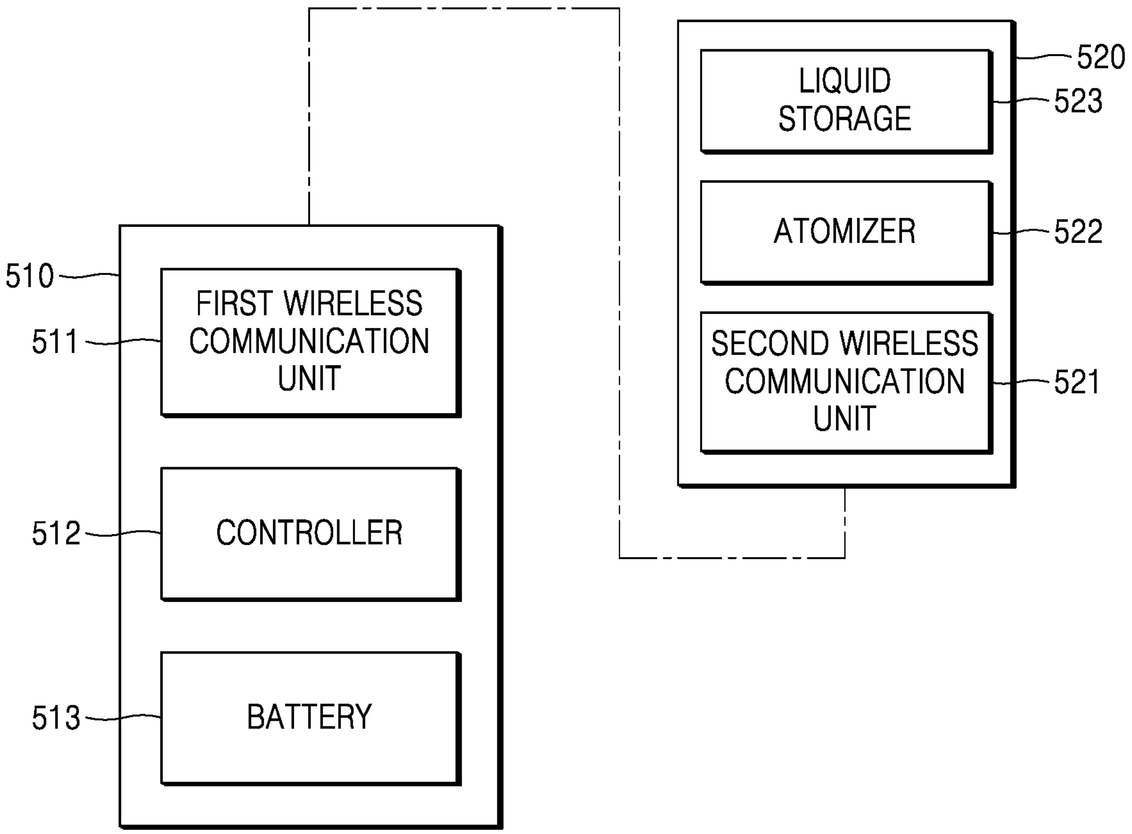
FIG. 5 is a block diagram of a state in which a main body is separated from a cartridge, according to an embodiment.

FIG. 5 is a block diagram of a state in which a main body is separated from a cartridge, according to an embodiment.

Referring to FIG. 5, an aerosol generating device may include a main body 510 and a cartridge 520. The main body 510 may include a first wireless communication unit 511, a controller 512, and a battery 513. The cartridge 520 may include a second wireless communication unit 521, an atomizer 522, and a liquid storage 523. However, it will be understood by one of ordinary skill in the art that according to the design of the main body 510 and the cartridge 520, some of the hardware components in FIG. 5 may be omitted or new components may be further added.

The first wireless communication unit 511 and the second wireless communication unit 521 may form a wireless communication network (i.e., wireless connection) and exchange data with each other. For example, the first wireless communication unit 511 and the second wireless communication unit 521 may form a Bluetooth-based wireless communication network.

A Bluetooth communication method includes a basic rate/enhanced data rate (BR/EDR) method and a Bluetooth low energy (BLE) method. The BR/EDR method may be referred to as a Bluetooth classic method. The Bluetooth classic method includes Bluetooth 1.0 supporting a basic rate and Bluetooth 2.0 supporting an enhanced data rate.

The BLE method is supported from Bluetooth 4.0 and may stably provide information of hundreds of kilobytes (KB) with low power consumption. The BLE method allows devices to exchange information with each other using an attribute protocol. The BLE method may reduce energy consumption by reducing the overhead of a header and simplifying an operation. For example, the first wireless communication unit 511 and the second wireless communication unit 521 may include a BLE module.

Before the first wireless communication unit 511 and the second wireless communication unit 521 form a wireless communication network, the controller 512 of the main body 510 may determine whether the cartridge 520 has been coupled to the main body 510.

In an embodiment, the main body 510 may include a connection terminal, which transmits power to the cartridge 520. The controller 512 may transmit power of the battery 513 to the cartridge 520 through the connection terminal. The controller 512 may periodically supply power to the connection terminal and determine whether the cartridge 520 has been coupled to the main body 510 based on a current flows through the connection terminal.

For example, when the cartridge 520 is coupled to the main body 510, the connection terminal of the main body 510 may be connected to the atomizer 522 of the cartridge 520 so that an inner circuit of the main body 510 is electrically connected to the cartridge 520. In this state, the controller 512 may control power output from the battery 513, supply the power to the connection terminal, and determine whether the cartridge 520 has been coupled to the main body 510 based on a current flows through the connection terminal.

In other words, when the cartridge 520 is not coupled to the main body 510, the inner circuit of the main body 510 is short-circuited, and accordingly, even if power is supplied to the connection terminal, there is no currents flowing through the connection terminal. Therefore, the controller 512 may determine that the cartridge 520 has not been coupled to the main body 510.

Alternatively, the main body 510 may include a separate sensor that detects whether the cartridge 520 has been coupled to the main body 510.

When it is determined that the cartridge 520 has been coupled to the main body 510, the controller 512 may activate the first wireless communication unit 511. When it is determined that the cartridge 520 has not been coupled to the main body 510, the first wireless communication unit 511 is maintained in a deactivated state so that power consumption of the main body 510 may be reduced. Alternatively, the controller 512 may activate the first wireless communication unit 511 after a preset power pattern is applied to the cartridge 520, which will be described below.

When it is determined that the cartridge 520 has been coupled to the main body 510, the controller 512 may control the battery 513 such that a preset power pattern is applied to the cartridge 520 (i.e., such that power is supplied to the cartridge 520 according to the preset power pattern). In response to the application of the preset power pattern to the cartridge 520, the second wireless communication unit 521 may be activated. When power supplied to the cartridge 520 is different from the preset power pattern, the second wireless communication unit 521 may be maintained in the deactivated state.

In an embodiment, after the first wireless communication unit 511 and the second wireless communication unit 521 are activated, a wireless communication network may be formed between the first wireless communication unit 511 and the second wireless communication unit 521. For example, when the first wireless communication unit 511 is activated after the cartridge 520 is coupled to the main body 510 and the second wireless communication unit 521 is activated after the preset power pattern is applied to the cartridge 520, a wireless communication network may be formed between the first wireless communication unit 511 and the second wireless communication unit 521.

At least one of the first wireless communication unit 511 and the second wireless communication unit 521 may be maintained in an activated state. For example, the first wireless communication unit 511 may be maintained in the activated state regardless of whether the cartridge 520 is coupled to the main body 510. Alternatively, the second wireless communication unit 521 may be maintained in the activated state regardless of whether the preset power pattern is applied to the cartridge 520.

When a wireless communication network is formed between the first wireless communication unit 511 and the second wireless communication unit 521 using the above-described method, the main body 510 may be prevented from forming a wireless communication network with an undesired cartridge. In other words, a wireless communication network may be formed between the main body 510 and the cartridge 520, as a user desires.

Figure 6:
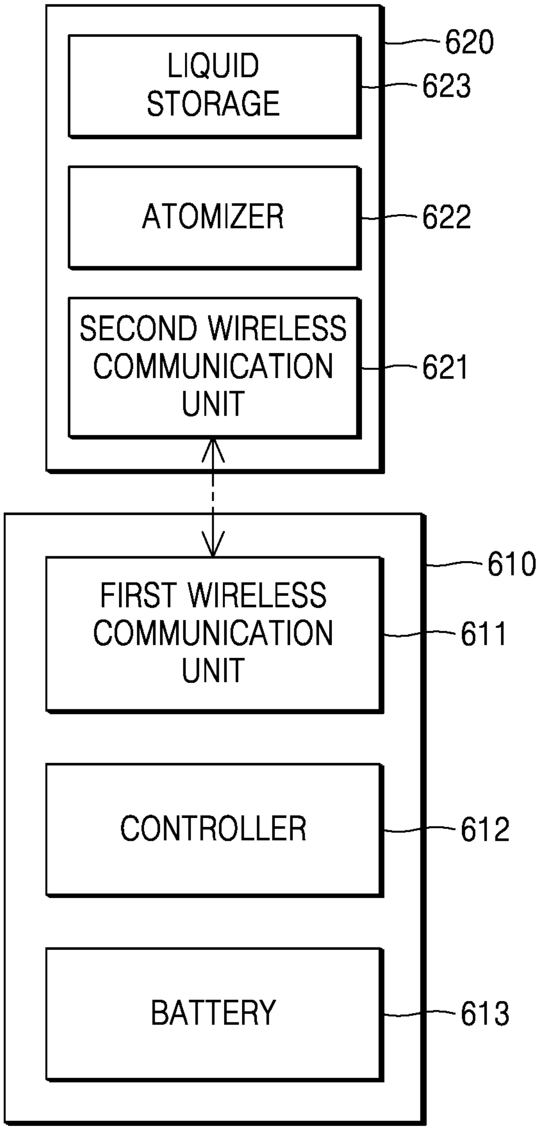
FIG. 6 is a block diagram of a state in which a main body is coupled to a cartridge, according to an embodiment.

FIG. 6 is a block diagram of a state in which a main body is coupled to a cartridge, according to an embodiment.

Hereinafter, redundant description given with FIG. 5 will be omitted for convenience of description.

When a cartridge 620 is inserted into an accommodation space of a main body 610, the cartridge 620 may be coupled to the main body 610. In a state where the cartridge 620 is coupled to the main body 610, a first wireless communication unit 611 of the main body 610 and a second wireless communication unit 621 of the cartridge 620 may form a wireless communication network.

In an embodiment, the cartridge 620 may further include a memory. The memory may be mounted on the second wireless communication unit 621 or may be a separate hardware component. A preset power pattern may be stored in the memory. A controller 612 may control a battery 613 to apply a power pattern to the cartridge 620. When the power pattern applied to the cartridge 620 is identical to the preset power pattern stored in the memory, the second wireless communication unit 621 may form a wireless communication network together with the first wireless communication unit 611.

When the first wireless communication unit 611 receives data from the second wireless communication unit 621, the controller 612 may supply power to the cartridge 620 based on the data. The cartridge 620 may include a liquid storage 623, which accommodates an aerosol generating material therein. An optimal temperature profile that defines a temperature to which an aerosol generating material is heated may be different depending on the kind of aerosol generating material stored in the liquid storage 623. The first wireless communication unit 611 may receive data about a temperature profile requested by the cartridge 620 from the second wireless communication unit 621, and the controller 612 may supply power to the cartridge 620 according to the temperature profile.

For example, first through third temperature profiles may be stored in the memory of the main body 610. When the first wireless communication unit 611 receives data requesting the first temperature profile from the second wireless communication unit 621, the controller 612 may supply power to the cartridge 620 according to the first temperature profile.

In an embodiment, the cartridge 620 may count the number of use. The cartridge 620 may count the number of use using a processor mounted on the second wireless communication unit 621. Alternatively, a controller separately included in the cartridge 620 may count the number of use.

When power applied to the cartridge 620 exceeds a threshold, the cartridge 620 may increase the use count by one. When the power applied to the cartridge 620 exceeds the threshold, it may mean that sufficient power is applied to a heater of an atomizer 622 so as to increase the temperature of the heater, and accordingly, an aerosol generating material in the liquid storage 623 is heated. Data about the number of use may be stored in the memory of the cartridge 620.

In an embodiment, the second wireless communication unit 621 may transmit the data about the number of use to the first wireless communication unit 611. The controller 612 may control power, which is applied to the cartridge 620, based on the data about the number of uses.

An increase in the number of use may indicate a decrease in the residual amount of the aerosol generating material in the liquid storage 623. As the residual amount of the aerosol generating material decreases, the aerosol generating material may be heated to a higher temperature than before even if the same power is supplied to the cartridge 620. Therefore, to generate a uniform amount of aerosol, the controller 612 may control power, which is applied to the cartridge 620, based on the data about the number of use which is received through the first wireless communication unit 611.

For example, first through third temperature profiles may be stored in the memory of the main body 610, and the total number of available use of the cartridge 620 may be set to 100. When the number of use of the cartridge 620 is 1 to 50, the controller 612 may supply power to the cartridge 620 according to the first temperature profile. When the first wireless communication unit 611 receives data, which indicates that the number of use exceeds 50, from the second wireless communication unit 621, the controller 612 may supply power to the cartridge 620 according to the second temperature profile. When the first wireless communication unit 611 receives data, which indicates that the number of use exceeds 80, from the second wireless communication unit 621, the controller 612 may supply power to the cartridge 620 according to the third temperature profile.

When the number of use exceeds a preset number, the controller 612 may cut off the power applied to the cartridge 620. Here, that the number of use exceeds the preset number may indicate that the aerosol generating material in the liquid storage 623 is exhausted. For example, in the case where the total number of available use of the cartridge 620 is set 100, when the first wireless communication unit 611 receives data indicating that the number of use has reached 100 from the second wireless communication unit 621, the controller 612 may cut off the power to the cartridge 620.

Meanwhile, when it is determined that the cartridge 620 has been coupled to the main body 610, the controller 612 may receive data about the number of use from the second wireless communication unit 621 through the first wireless communication unit 611. When the number of use received from the second wireless communication unit 621 exceeds the preset number, the controller 612 may prevent reuse of the cartridge 620 by cutting off the power to the cartridge 620.

According to an embodiment, the first wireless communication unit 611 may receive data about a temperature profile requested by the cartridge 620 from the second wireless communication unit 621, and accordingly, the main body 610 may supply power to the cartridge 620 based on the temperature profile optimized to the cartridge 620.

In addition, the first wireless communication unit 611 may receive data about the number of use from the second wireless communication unit 621, and accordingly, the exhaustion of the aerosol generating material in the liquid storage 623 may be considered when the main body 610 supplies power to the cartridge 620. Therefore, reuse of the cartridge 620 may be prevented.

Figure 7:
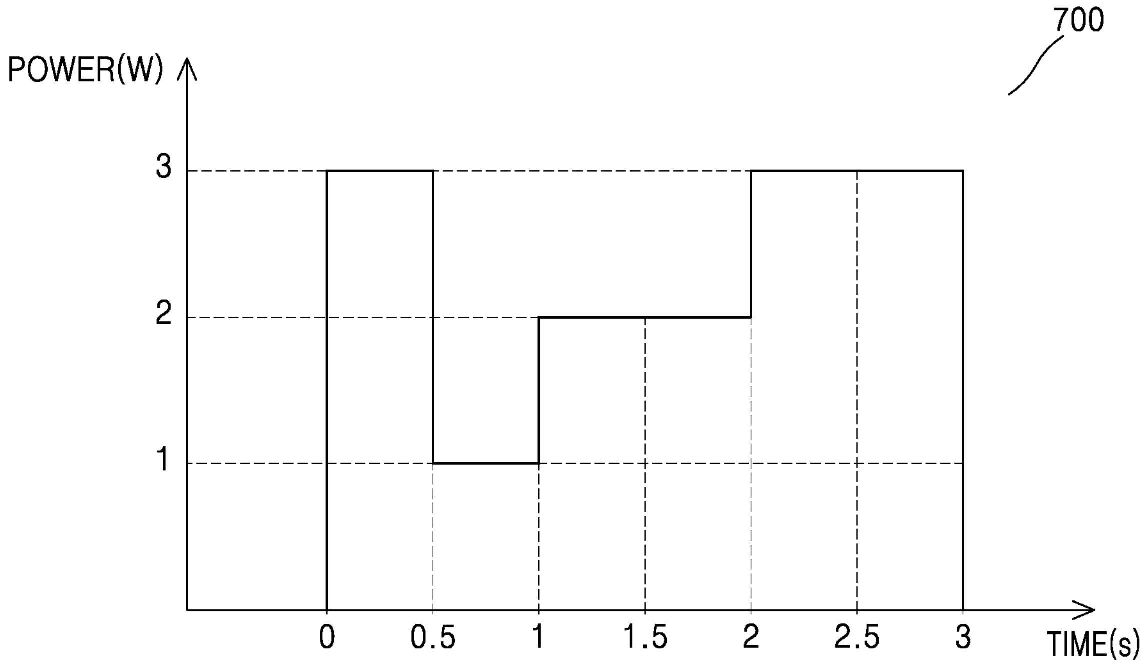
FIG. 7 is a diagram illustrating a power pattern according to an embodiment.

FIG. 7 is a diagram illustrating a power pattern according to an embodiment.

FIG. 7 illustrates a power pattern 700 expressed as a graph of power versus time.

FIG. 7 shows the power pattern 700 that lasts for three seconds. Between 0 seconds and 0.5 seconds, a power of 3 W may be supplied from the main body to the cartridge. Between 0.5 seconds and 1 second, a power of 1 W may be supplied from the main body to the cartridge. Between 1 second and 2 seconds, a power of 2 W may be supplied from the main body to the cartridge. Between 2 seconds and 3 seconds, a power of 3 W may be supplied from the main body to the cartridge. However, the duration and power level of the power pattern 700 are not limited to FIG. 7.

When a preset power pattern is supplied from the main body to the cartridge, a wireless communication network may be formed between the main body and the cartridge.

Figure 8:
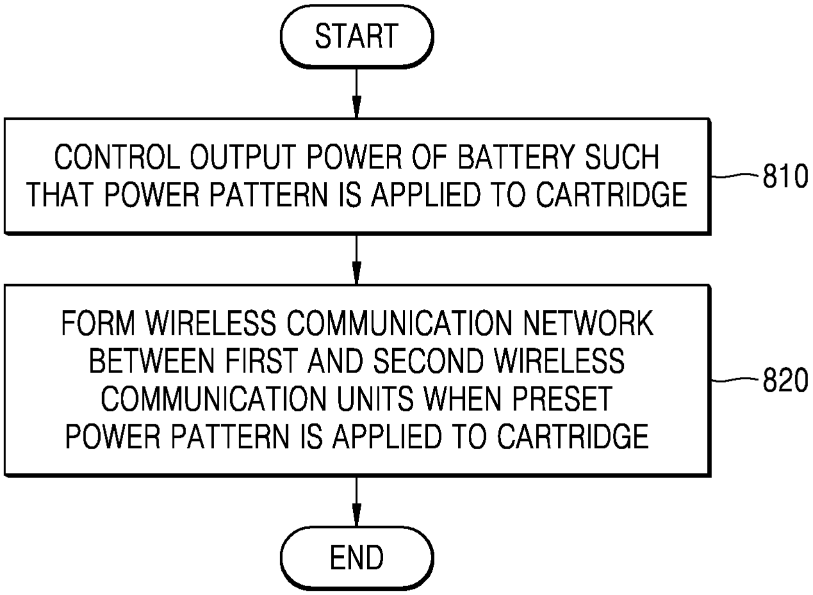
FIG. 8 is a flowchart of a method of controlling an aerosol generating device, according to an embodiment.

FIG. 8 is a flowchart of a method of controlling an aerosol generating device, according to an embodiment.

Referring to FIG. 8, the aerosol generating device may control output power of a battery such that a power pattern is applied to a cartridge in operation 810.

The aerosol generating device may include a main body and the cartridge. The main body may include a first wireless communication unit, a controller, and the battery. The cartridge may include a second wireless communication unit, an atomizer, and a liquid storage.

The first wireless communication unit and the second wireless communication unit may form a wireless communication network and exchange data with each other. The first wireless communication unit and the second wireless communication unit may form a Bluetooth-based wireless communication network. For example, the first wireless communication unit and the second wireless communication unit may include a BLE module.

Before the first wireless communication unit and the second wireless communication unit form a wireless communication network, the controller may determine whether the cartridge has been coupled to the main body. In an embodiment, the controller may periodically supply power to a connection terminal and determine whether the cartridge has been coupled to the main body based on a current flowing through the connection terminal. Alternatively, the main body may include a separate sensor that detects whether the cartridge has been coupled to the main body.

When it is determined that the cartridge has been coupled to the main body, the controller may activate the first wireless communication unit. When it is determined that the cartridge has been coupled to the main body, the controller may control the battery such that a preset power pattern is applied to the cartridge.

At least one power pattern may be stored in a memory of the main body. When the cartridge is coupled to the main body, the controller of the main body may control power, which is output from the battery of the main body, based on the power pattern stored in the memory.

When a preset power pattern is applied to the cartridge, the aerosol generating device may form a wireless communication network between the first wireless communication unit and the second wireless communication unit in operation 820.

When the preset power pattern is applied to the cartridge, the second wireless communication unit may be activated.

When operations 810 and 820 are performed, the first wireless communication unit and the second wireless communication unit may be activated. After the first wireless communication unit and the second wireless communication unit are activated, a wireless communication network may be formed between the first wireless communication unit and the second wireless communication unit.

For example, when the first wireless communication unit is activated after the cartridge is coupled to the main body and the second wireless communication unit is activated after the preset power pattern is applied to the cartridge, a wireless communication network may be formed between the first wireless communication unit and the second wireless communication unit.

In an embodiment, when the first wireless communication unit receives data from the second wireless communication unit, the controller may supply power to the cartridge based on the data. The first wireless communication unit may receive data about a temperature profile requested by the cartridge from the second wireless communication unit, and the controller may supply power to the cartridge according to the temperature profile.

In an embodiment, when power supplied to the cartridge exceeds a threshold, the cartridge may increase the use count by one. The second wireless communication unit may transmit data about the number of use to the first wireless communication unit. Based on the data about the number of use received through the first wireless communication unit, the controller may control power supplied to the cartridge.

The main body may include a memory storing a plurality of temperature profiles. The controller may select one of the temperature profiles, which are stored in the memory, based on the data about the number of use received through the first wireless communication unit. The controller may also control the battery such that power is supplied to the cartridge based on the selected temperature profile. In addition, the controller may cut off power to the cartridge when the number of use exceeds a preset number.

One embodiment may also be implemented in the form of a computer-readable recording medium including instructions executable by a computer, such as a program module executable by the computer. The computer-readable recording medium may be any available medium that can be accessed by a computer and includes both volatile and nonvolatile media, and removable and non-removable media. In addition, the computer-readable recording medium may include both a computer storage medium and a communication medium. The computer storage medium includes all of volatile and nonvolatile, and removable and non-removable media implemented by any method or technology for storage of information such as computer-readable instructions, data structures, program modules or other data. The communication medium typically includes computer-readable instructions, data structures, other data in modulated data signals such as program modules, or other transmission mechanisms, and includes any information transfer media.

At least one of the components, elements, modules or units (collectively "components" in this paragraph) represented by a block in the drawings such as the controller 460, the user interface 440, the sensor 430, the first wireless communication unit 511, and the second communication unit 521 may be embodied as various numbers of hardware, software and/or firmware structures that execute respective functions described above, according to an example embodiment. For example, at least one of these components may use a direct circuit structure, such as a memory, a processor, a logic circuit, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a central processing unit (CPU) that performs the respective functions, a microprocessor, or the like. Two or more of these components may be combined into one single component which performs all operations or functions of the combined two or more components. Also, at least part of functions of at least one of these components may be performed by another of these components. Further, although a bus is not illustrated in the above block diagrams, communication between the components may be performed through the bus. Functional aspects of the above example embodiments may be implemented in algorithms that execute on one or more processors. Furthermore, the components represented by a block or processing steps may employ any number of related art techniques for electronics configuration, signal processing and/or control, data processing and the like.

The descriptions of the above-described embodiments are merely examples, and it will be understood by one of ordinary skill in the art that various changes and equivalents thereof may be made. Therefore, the scope of the disclosure should be defined by the appended claims, and all differences within the scope equivalent to those described in the claims will be construed as being included in the scope of protection defined by the claims.

What is claimed is:

1. An aerosol generating device comprising:

a main body including a controller, a battery, and a first wireless communication unit; and a cartridge including a second wireless communication unit and detachably coupled to the main body, wherein the controller controls power supplied from the battery to the cartridge, wherein the first wireless communication unit establishes a wireless connection with the second wireless communication unit based on the supplied power matching a preset power pattern, wherein the cartridge further includes a second memory storing the preset power pattern, wherein the second wireless communication unit transmits data to the first wireless communication unit based on the power supplied to the cartridge matching the preset power pattern, and wherein the controller controls the battery to supply power to the cartridge based on the data received through the first wireless communication unit.

2. The aerosol generating device of claim 1, wherein the second wireless communication unit is activated based on the supplied power matching the preset power pattern.

3. The aerosol generating device of claim 1, wherein the main body further includes a first memory storing a plurality of temperature profiles, and the controller selects one of the plurality of temperature profiles based on the data received through the first wireless communication unit and controls the battery to supply the power to the cartridge based on the selected temperature profile.

4. The aerosol generating device of claim 1, wherein the controller detects whether the cartridge has been coupled to the main body, receives data about a number of use of the cartridge from the second wireless communication unit through the first wireless communication unit based on determining that the cartridge is coupled to the main body, and cuts off the power supplied to the cartridge based on the number of use exceeding a preset number.

5. The aerosol generating device of claim 1, wherein the controller detects whether the cartridge has been coupled to the main body, and activates the first wireless communication unit based on determining that the cartridge is coupled to the main body.

6. The aerosol generating device of claim 5, wherein the main body further includes a connection terminal that delivers the power from the battery to the cartridge, and the controller determines whether the cartridge has been coupled to the main body based on a current flowing through the connection terminal.

7. An aerosol generating device comprising:

a main body including a controller, a battery, and a first wireless communication unit and a cartridge including a second wireless communication unit and detachably coupled to the main body, wherein the controller controls power supplied from the battery to the cartridge, wherein the first wireless communication unit establishes a wireless connection with the second wireless communication unit based on the supplied power matching a preset power pattern, and wherein the cartridge increases a use count by one based on power supplied to the cartridge exceeding a preset threshold.

8. The aerosol generating device of claim 7, wherein the second wireless communication unit transmits data about a number of use of the cartridge to the first wireless communication unit, and the controller controls the power supplied to the cartridge based on the data about the number of use.

9. The aerosol generating device of claim 8, wherein the main body further includes a first memory storing a plurality of temperature profiles, and the controller selects one of the plurality of temperature profiles based on the data about the number of use, and controls the power supplied to the cartridge based on the selected temperature profile.

10. The aerosol generating device of claim 8, wherein the controller cuts off the power supplied to the cartridge based on the number of use exceeding a preset number.

11. A method of controlling an aerosol generating device including a main body which includes a battery and a first wireless communication unit, and a cartridge which includes a second wireless communication unit and is detachably coupled to the main body, the method comprising:

controlling power supplied from the battery to the cartridge;

establishing a wireless connection between the first wireless communication unit and the second wireless communication unit based on the supplied power matching a preset power pattern;

receiving, through the first wireless communication unit, data transmitted from the second wireless communication unit, based on the established the wireless connection between the first wireless communication unit and the second wireless communication unit; and controlling the battery to supply power to the cartridge based on the data received through the first wireless communication unit.

12. The method of claim 11, wherein the second wireless communication unit is activated based on the supplied power matching the preset power pattern.

13. The method of claim 11, further comprising:

detecting whether the cartridge is coupled to the main body; and activating the first wireless communication unit based on determining that the cartridge is coupled to the main body as a result of the detecting.

14. A computer-readable recording medium having recorded thereon a program for executing the method of claim 11 on a computer.

* * * * *